Feb. 1, 1966 G. VALENSI 3,233,038

COLOR TELEVISION RECEIVER

Original Filed Dec. 19, 1961 4 Sheets-Sheet 1

INVENTOR.

GEORGES VALENSI

By Kurt Kelman agent

Feb. 1, 1966 G. VALENSI 3,233,038

COLOR TELEVISION RECEIVER

Original Filed Dec. 19, 1961 4 Sheets-Sheet 2

INVENTOR.

GEORGES VALENSI

By [signature] agent

INVENTOR.
GEORGES VALENSI
By Kurt Kelman
agent

INVENTOR.

GEORGES VALENSI

By Kurt Kelman agent 3,233,038
Patented Feb. 1, 1966

3,233,038

COLOR TELEVISION RECEIVER

Georges Valensi, 3 Rue des Chaudronniers, Geneva, Switzerland

Continuation of application Ser. No. 160,540, Dec. 19, 1961. This application July 8, 1965, Ser. No. 473,898
3 Claims. (Cl. 178—5.4)

This is a continuation of my copending application Serial No. 160,540, filed December 19, 1961; now this invention concerns improvements of the color television receivers described in U.S. Patent No. 2,990,449, and in which are superimposed, upon a projection screen (EP), a detailed black-and-white picture of the televised scene produced by a first projector (P*bn*), and a coarse picture of said scene, in saturated colors, produced by a second projector (P*c*), a "luminance weighting device" (DPL) adjusting the ratio of white light ($F_1$) emerging from said first projector, to colored light ($F_2$) emerging from said second projector, in order to obtain the proper degree of color saturation for each point of the picture so produced on said screen (EP).

FIGURE 1–*a* represents the spectrum of the received videosignal (SV) applied to the receiver's videopart (PR) (FIGURE 1), L being the luminance signal, and (C*hr*) the chrominance signal from which are derived: (1) by means of an electronic circuit, not shown, the saturation signal (S) proportional to the degree of saturation of the color to be reproduced on projection screen (EP), and (2) by means of another electronic circuit (ME), a group (C) of 3 color signals corresponding to the blue, green and red components of the hue of said color to be reproduced.

(SVS) is the synchro-video-separator producing the field-synchronizing-signals ($t_i$) and the line-synchronizing-pulses ($t_1$).

In U.S. Patent No. 2,990,449, the "luminance weighting device" is a simple pentode, the control grid of which is energized by band ($B_3$) of the luminance spectrum (FIGURE 1–*a*), and is negatively biased by the saturation signal (S); the output voltage of said pentode is, in a mixer, added to band ($B_2$) of the luminance spectrum, and the output voltage (L′) of said mixer is the "weighted luminance signal" controlling said first projector (P*bn*) for producing a detailed black-and-white picture of the televised scene. In case of a large part of said scene having a uniform very saturated color, but having different brightnesses at different points, said mixer throws some white light upon the corresponding part of projection screen (EP), and therefore a uniformly very saturated color is not obtained as desired.

In the present invention, an improved "luminance weighting device (DPL)," constructed as shown on FIGURE 2, or on FIGURE 3, is controlled by the saturation signal (S) and by the whole luminance signal (L), that is the sum of band ($B_3$) and band ($B_2$) of FIGURE 1–*a*; the luminance weighted signal (L′) produced at the output of said device (DPL) for controlling said first projector (P*bn*) is exactly proportional to the ratio ($L/S$) of luminace to color saturation, and is practically zero in case of a part of the televised scene having a high degree of color saturation.

In U.S. Patent No. 2,990,449 the color-projector (P*c*, FIGURE 1) comprises only one group of three juxtaposed crystals inserted between crossed polariser and analyser and respectively associated with color filters passing only a blue, or a green, or a red light; the birefractions of said crystals are respectively controlled by said 3 color signals (C, FIGURE 1) which correspond to the components of the hue of the color to be reproduced on screen (EP); so is produced a single thin beam of colored light, reflected successively on the mirrors of a rotating drum (not shown on FIGURE 1) in order to sweep, at great speed, the entire surface of screen (EP); as said single thin beam of colored light moves at great speed, an adequate brightness is obtained, for the coarse picture of the televised scene in saturated colors, only if said screen has a small size.

In the present invention, the color projector (P*c*) comprises as many groups of three juxtaposed crystals as there are colored elements in one line of the televised scene, and the corresponding thin beams of colored lights produce, on the projection screen (EP), juxtaposed colored elements which remain during the scanning time of said line of the televised scene, because an electronic memory device keeps constant, during that time, the controlling voltages applied to said crystals.

The invention will be better understood in referring to the appended drawings in which.

Figure 5:
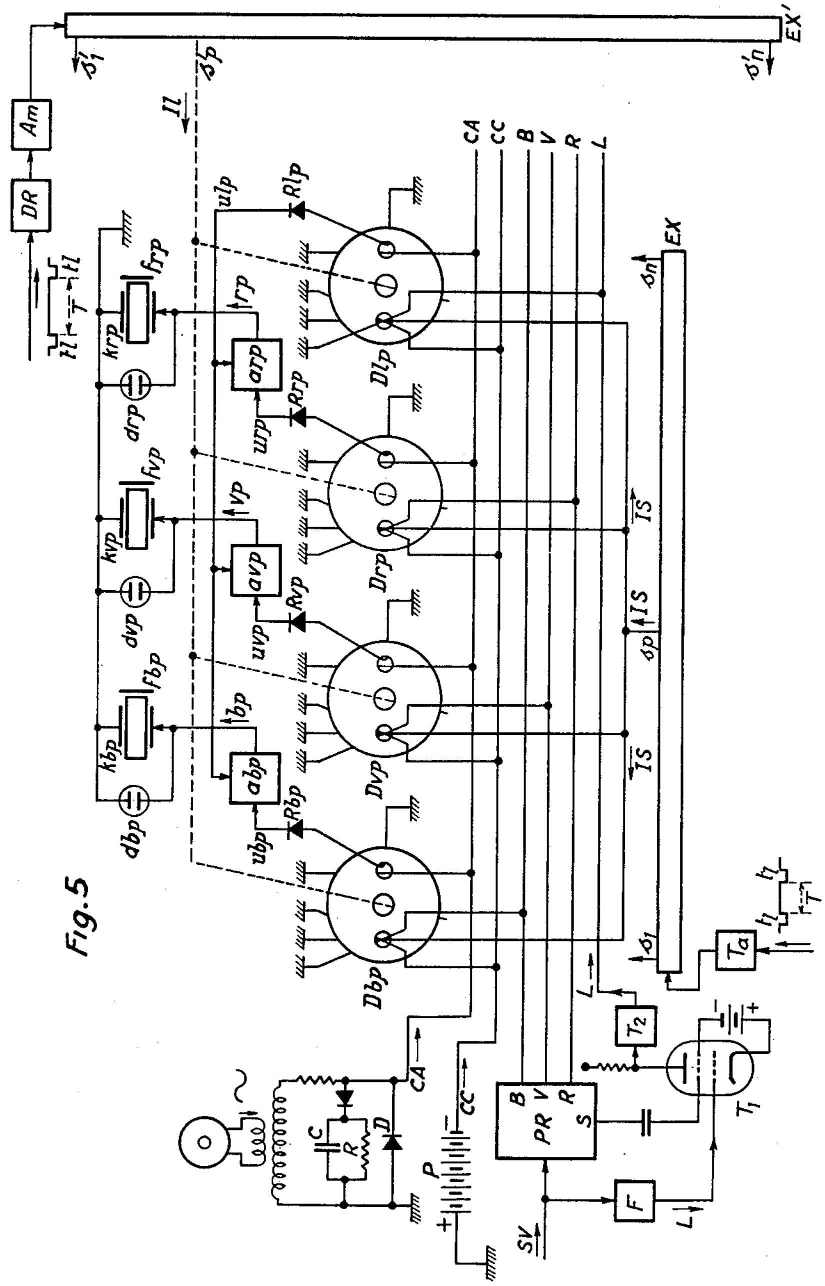
Figure 5A:
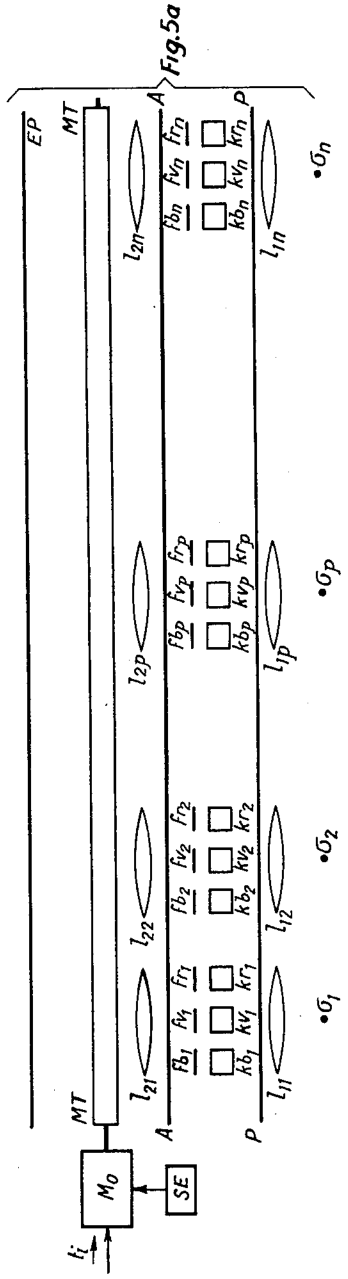
Figure 5B:
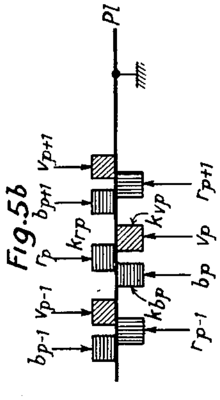
Figure 5C:
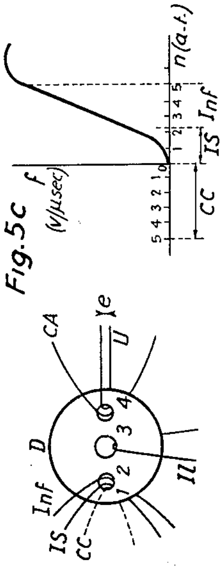
Figure 5D:
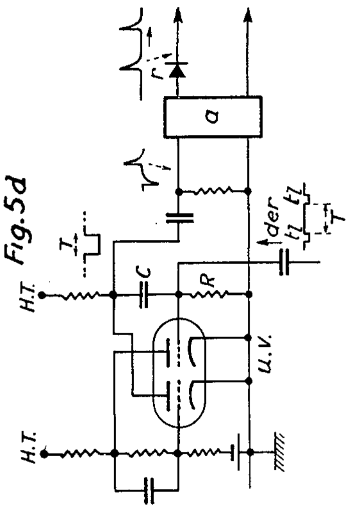

FIGURES 5*a* and 5*b* are related to the optical arrangement of the color television receiver, and show a row of groups of three juxtaposed birefracting crystals, one group of three crystals being provided for each colored picture element of one line of the televised scene;

FIGURE 5 represents the "control chain" of one of these groups of three crystals, and shows the ferrite discs acting as electronic memory; FIGURES 5*c* and 5*d* illustrate part of FIGURE 5.

Figure 1:
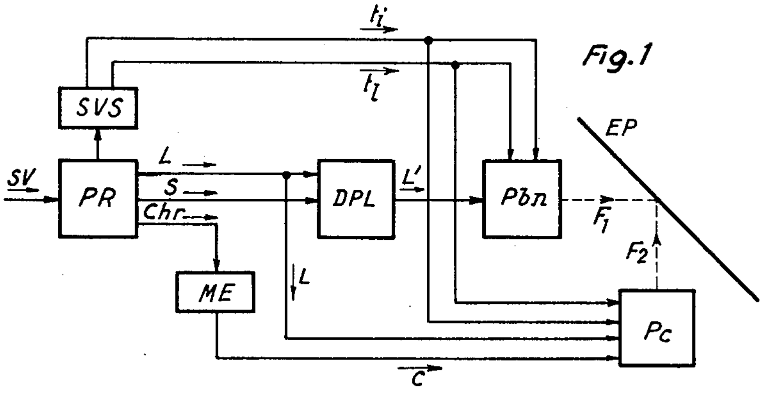
FIGURE 1 illustrates the principle of color television projection, and FIGURE 1–*a* shows the spectrum of the received videosignal.
Figure 1A:
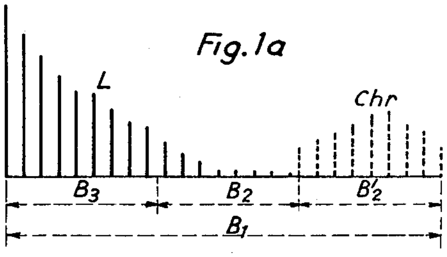
Figure 2:
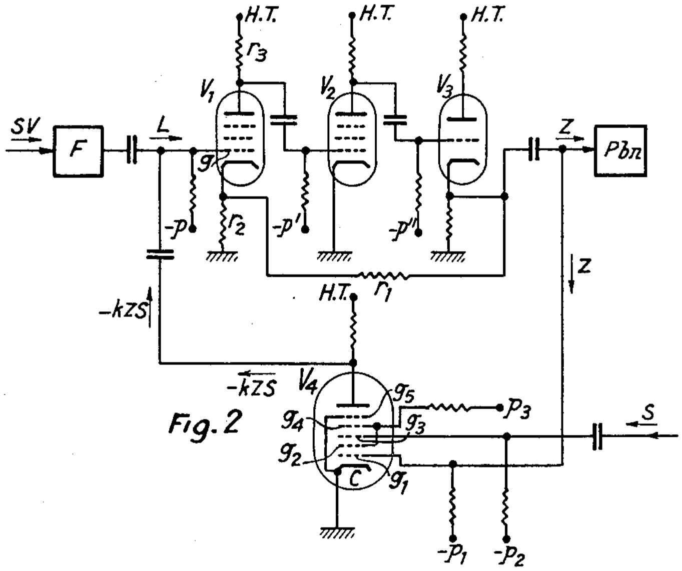
FIGURES 2 and 3 are related to the improved luminance weighting device.

Referring now to FIGURE 2, which represents one mode of construction of the luminance weighting device (DPL) of FIGURE 1, the electric filter F separates the luminance signal (L)—bands ($B_3$) and ($B_2$) of the spectrum of the received videosignal (SV) shown on FIGURE 1–*a*; said signal (L) is applied to the input terminal of an amplifier having a high gain (A), and made of pentodes ($V_1$) and ($V_2$) and cathode-follower ($V_3$); said amplifier is stabilized by a voltage-feed-back-circuit (resistor $r_1$), the current-feed-back being negligible because resistor ($r_2$) is small compared to resistor ($r_3$).

$V_4$ is an heptode having its first control grid ($g_1$) energized by the output voltage Z of cathode follower $V_3$, its second control grid ($g_3$) energized by the saturation signal S, and its cathode *c* connected to ground; suitable bias ($p_1$, $p_2$, $p_3$) are applied to said control grids ($g_1$, $g_3$) and to the screen-grids ($g_2$, $g_4$). On the anode of heptode $V_4$ is obtained a voltage ($-k.Z.S$), $k$ being a constant, which is applied to the control-grid ($g$) of pentode $V_1$, simultaneously with luminance signal L.

Consequently, $Z=A$ ($L—k.Z.S$) and, as A is very great, $$Z=\frac{1}{k}\frac{L}{S}$$

Z is therefore the desired weighted luminance signal (called L′ on FIGURE 1) for controlling the black and white television projector (P*bn*).

Figure 3:
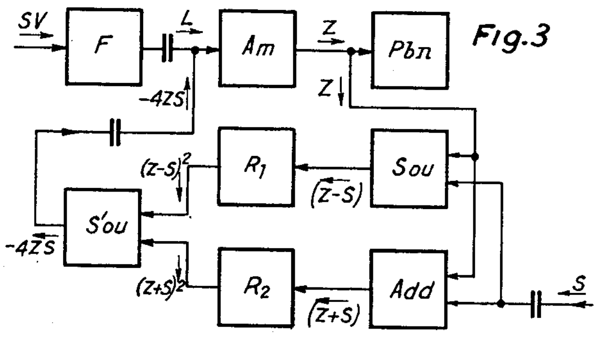

FIGURE 3 represents another mode of construction of the luminance weighting device (DPL) of FIGURE 1; F is again an electric filter energized by the received video signal SV and separating the luminance signal L applied to the high gain amplifier $A_m$ (made of pentodes $V_1$ $V_2$ and cathode follower $V_3$ of FIGURE 2). The output voltage Z of $A_m$ and the saturation signal S are simultaneously applied to electronic added (Add) producing, at its output, an electric voltage ($Z+S$), and to electronic subtractor (S*ou*) producing, at its output, an electric voltage ($Z—S$). $R_1$ and $R_2$ are non-linear-amplifiers producing, at their output terminals, voltages equal to the square of the input voltages; the output voltages of $R_1$ and $R_2$, equal respectively to $(Z+S)^2$ and $(Z-S)^2$, are simultaneously applied to electronic subtracter (Sou'), which produces a voltage equal to:

$$(Z-S)^2-(Z+S)^2=Z^2-2ZS+S^2-(Z^2+2ZS+S^2)=-4ZS$$

This electric voltage $(-4ZS)$ is applied to the input of amplifier $A_m$ (having a high gain A), simultaneously with luminance signal L. Consequently:

$$Z=A(L-4ZS)$$

and, as A is very great, $$Z=\frac{1}{4}\frac{L}{S}$$

Z is therefore the desired luminance weighted signal (called L' on FIGURE 1) for controlling the black and white television projector (Pbn).

Figure 4:
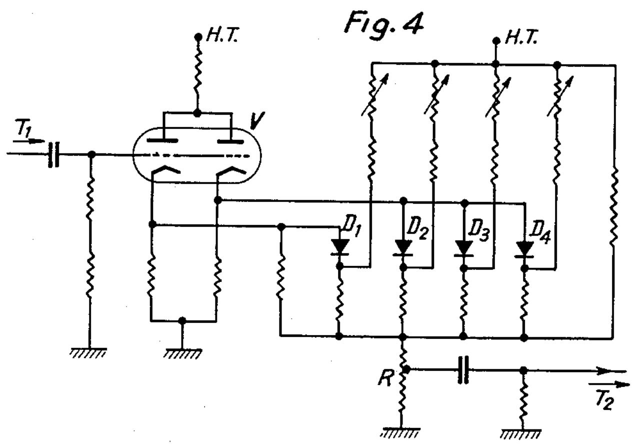
FIGURES 4 and 4*a* illustrate a part of FIGURE 3.
Figure 4A:
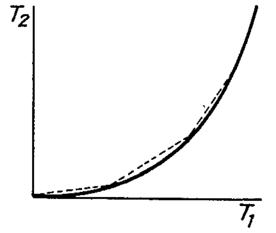

FIGURE 4 illustrates the operation of the non-linear amplifiers $R_1$, $R_2$ of FIGURE 2. When the voltage $T_1$ applied to the grid of the double cathode-follower V increases, the diodes ($D_1$, $D_2$, $D_3$, $D_4$) in the output circuit conduct, so that the output resistance (made of resistor R and said diodes) decreases progressively, and the rate of increase of the output voltage $T_2$ increases correspondingly; FIGURE 4a represents the transfer characteristic so obtained: dotted polygon, within the solid curve of equation $T_2=(T_1)^2$, and having as many linear parts as diodes inserted in the output circuit of FIGURE 4.

Referring to FIGURE 5a, which represents the optical arrangement of the color projector (Pc, FIGURE 1) for producing said coarse picture, in saturated colors, of the televised scene: each thin beam of white light emitted by a source ($\sigma_p$) and collimated by a lens $l_{1p}$ is color-modulated by a group of three juxtaposed transparent ferroelectric bodies ($k_{bp}$, $k_{vp}$, $k_{rp}$) associated with color filters ($f_{bp}$ for blue, $f_{vp}$ for green, and $f_{rp}$ for red), P being a polariser and A an analyser crossed with P.

The colored light emerging from lens $l_{2p}$ is, after reflection on rotating mirror drum $M_t$, concentrated on a small elemental area of projection screen EP for producing the $p^{th}$ element of one line of the coarse colored picture of the televised scene. In accordance with the American color television standards (60 interlaced fields per second, aspect ratio 4/3), assuming a chrominance signal occupying a bandwidth of 1 megacycle per second, there will be 188 groups of 3 transparent bodies (such as $k_{bp}$, $k_{vp}$, $k_{rp}$ on FIGURE 5b) aligned on a common electrode $P_1$.

The ferroelectric transparent bodies (such as $k_{bp}$, $k_{vp}$, $r_{rp}$ of FIGURES 5 and 5a) are, for example, small cubic monocrystals of barium titanate ($B_aT_iO_3$) cut perpendicularly to their optic axis; wires $b_p$, $v_p$, $r_p$ (FIG. 5b) apply to said crystals the hue signals (B for blue, V for green and R for red) derived from the received videosignal SV (FIGURE 5). In this case use is made of the transversal effect, the luminous rays being perpendicular to the plane of FIGURE 5b whereas the modulating voltage (applied by wires $b_p$, $v_p$ or $r_p$ and producing the desired birefraction) is parallel to said plane. For such cubes of barium titanate monocrystal, the voltage required, between $P_1$ and $b_p$ (or $v_p$, or $r_p$), for producing the maximum light intensity change is of the order of 400 volts.

For increasing the brightness of the colored picture produced on screen EP (FIGURE 5a), memories are inserted in the control chain of the electric birefraction of transparent bodies $k_{bp}$, $k_{vp}$, $k_{rp}$; these memories are, for example, the ferrite disks $D_{bp}$, $D_{vp}$, $D_{rp}$ (associated with $D_{1p}$) shown on FIGURE 5; they maintain the light for each element of the colored picture on screen EP during the duration (T) of one scanning line as explained hereafter.

FIGURE 5c, on the left shows one of these ferrite discs (D) with 3 openings, offering 4 branches of equal width, respectively numbered 1, 2, 3 and 4.

In the hole between branches 1 and 2 pass: (1) a winding carrying a negative bias (CC) (shown on the right of FIGURE 5c) and produced by battery P (FIGURE 5), (2) a winding carrying a "selection pulse IS" coming from one output (sp) of scanner EX (FIGURE 5) which is an artifical delay line or a magnetic shift register, (3) a winding carrying an "information signal Inf" which, in case of disc $D_{bp}$ or $D_{vp}$ or $D_{rp}$ (FIGURE 5), is one of the components of the hue of the saturated color to be reproduced (hue signals B, V, R, taken from the busbars fed by the corresponding terminals B, V or R, of electronic arrangement PR energized by the received videosignal SV); in case of disc $D_{1p}$ (FIGURE 5) the information signal Inf is the luminance signal L (bands $B_3$ and $B_2$ of the videosignal-spectrum, FIGURE 1–a) separated by electric filter F and amplified by tetrode $T_1$ followed by inverting triode $T_2$. As shown on FIGURE 5, the negatively biased gird to tetrode $T_1$ acts as a gate which opens only if saturation signal S has a positive value sufficient for overcoming said negative bias, that is, only if the part of the televised scene to be reproduced at the considered moment has a saturated color.

In the hole between branches 3 and 4 (FIGURES 5 and 5c) pass: (1) a winding carrying an alternating current CA having unequal positive and negative parts in each period, and (2) another winding U in which said alternating current CA induces: the electric voltage (e) for controlling the birefraction of the ferroelectric body associated to the disc ($k_{bp}$ for disc $D_{bp}$, $k_{vp}$ for disc $D_{vp}$, or $k_{rp}$ for disc $D_{rp}$, FIGURE 5), or, in case of disc $D_{1p}$ (FIGURE 5), the electric voltage (e) for controlling simultaneously the gains of amplifiers $a_{bp}$, $a_{vp}$, $a_{rp}$ as a function of the luminance L, only when a very saturated color must be reproduced; in the latter case, the variations of brightness from point to point in a large part of the televised scene having a saturated color are so correctly reproduced on the projection screen at the receiving station. Rectifiers $R_{bp}$, $R_{vp}$, $R_{rp}$ (shown on FIGURE 5) are in series with amplifiers $a_{bp}$, $a_{vp}$, $a_{rp}$ respectively, in the circuits applying the birefraction controlling voltages to bodies $k_{bp}$, $k_{vp}$ or $k_{rp}$ and rectifier $R_{1p}$ is in the circuit (of FIGURE 5) for controlling the gains of amplifiers $a_{bp}$, $a_{vp}$, $a_{rp}$ as mentioned above. In parallel with the modulating electrodes of ferroelectric bodies $k_{bp}$, $k_{vp}$, $k_{rp}$ are diodes ($d_{bp}$, $d_{vp}$, $d_{rp}$) for stopping, at the right time, the birefraction of said bodies, as they constitute (between their respective electrodes) capacitors which must be discharged before receiving another electric charge.

In the central hole of each ferrite disk, there is a winding carrying a "clearing pulse ($I_1$)" which (at the end of each scanning line) suppresses the effect of negative bias (CC) together with the "marking" of the ferrite disk produced simultaneously by the selection winding (IS) and the information winding (Inf).

FIGURE 5c, at the right, shows the characteristic of such ferrite disks, the abcissa being the number (n) of ampere-turns produced by either of these windings (IS or Inf) and the ordinate being the "set flux" $f=\int edt$, expressed in volt-microsecond. The ampere-turns (produced by either IS winding or Inf winding) would be inadequate to overcome the negative bias (CC), whereas their sum brings the operating point into the linear part of the characteristic, at a level corresponding to the amplitude of the information pulse (Inf); the "marking" so carried out at this level persists up to the application of the clearing pulse ($I_1$), because the magnetic circuit through branches 1 and 2 of the disk "protects" the magnetic flux in the circuit through branches 3 and 4.

The scanner EX takes the positive selection pulse (IS), which is the received negative line cynchronizing pulse ($t_1$) inverted and amplified by triode $T_0$ (FIGURE 5). Since it is desired that each "utilisation circuit" (such as $u_{bp}$ should operate through the duration T of a scanning line, use is made, to produce the clearing pulse ($I_1$), of a second scanner EX′ (for example another magnetic shift register) which carries a positive pulse produced by the negative line synchronizing pulse ($t_1$) through a "delaying device (DR)" and an amplifier A*m*. This local delayer (DR), shown on FIGURE 5*d*, is a series set-up consisting of an univibration (*uv*) having a capacitor C and a resistor R which determine the desired duration (T) of a rectangular output pulse, a derivating circuit (*der*) having series capacitor and parallel resistor, an amplifier (*a*), and finally a rectifier (*r*).

The alternating current CA (FIGURE 5) is produced by the sine-wave-generator O associated with a germanium diode D having a non-linear characteristic; an appropriate amplitude threshold being produced by capacitor C and resistor R in parallel, a wave having unequal positive and negative parts is obtained at the output, and feeds the busbar labelled CA on FIGURE 5.

As shown on FIGURES 5 and 5*a*, for each element of a line of the coarse colored picture to be produced on projection screen EP, there is a "control chain" with 4 ferrite disks (such as $D_{bp}$, $D_{vp}$, $D_{rp}$ and $D_{1p}$) and three transparent ferroelectric bodies (such as $k_{bp}$, $k_{vp}$ and $k_{rp}$ with their associated color filters $f_{bp}$, $f_{vp}$, $f_{rp}$) the electrodes of which are submitted to electric voltages modultaing the color of the light emerging from final lens (such as $l_{2p}$); these various control chains are juxtaposed along the line of electric sources of white light (188 lamps such as $\sigma_p$, for U.S. color television standards). The length of the whole is a few meters, i.e. the width of a large projection screen.

While the invention has been illustrated and described as hereabove, it is not intended to be limited to the details shown, since various modifications and structural changes may be made without departing in any way from the spirit of the present invention.

What is claimed as new and desired to be secured by Letters Patent is:

1. Color television receiver of the type having a projection screen on which are superimposed a detailed black-and-white picture of the televised scene produced by a first projector controlled by a luminance-weighted-signal, and a coarse picture, in saturated colors, of said scene produced by a second projector using transparent bodies becoming birefracting in proportion to color signals characterizing the components of the hue of the color to be reproduced on said screen, comprising:

a device for producing said luminance-weighted-signal which controls said first projector, made of a high-gain-amplifier energized by the received luminance signal and of an electronic multiplier controlled both by the output voltage of said amplifier and by a saturation-signal derived from the received chrominance signal, said multiplier applying a feed-back-voltage to the input of said amplifier;

and comprising, within said second projector, for each colored element of one line of the televised scene:

a small source of parallel rays of polarized white light;

one particular group of three transparent crystals juxtaposed with the same orientation of their axes and exposed to said parallel rays, said color signals controlling electric fields applied to said three crystals;

a color filter having juxtaposed elements of saturated blue, green and red colors, respectively in line with said three juxtaposed crystals;

a group of ferrite discs acting as electronic memory for keeping the intensities of said electric fields applied to said crystals constant during the whole scanning of said line of the televised scene;

an analyser located beyond said color filter and transverse to the direction of polarization of said parallel rays;

and a lens located beyond said analyser, for focussing the colored light emerging from said analyser upon the part of said projection screen corresponding to said colored element of said line of the televised scene, whereby there are produced, on said screen, juxtaposed colored picture elements each having the same saturated color on its entire surface, and forming together said coarse picture, in saturated colors, of the televised scene.

2. Color television receiver in accordance with claim 1, in which said electronic multiplier, within said device producing said luminance weighted signal, is an heptode having two control-grids respectively energized by the output-voltage of said high-gain-amplifier and by said saturation signal proportional to the degree of saturation of the color to be reproduced on said projection screen.

3. Color television receiver in accordance with claim 1, in which said electronic multiplier, within said device producing said luminance weighted signal comprises in combination.:

an electronic adder and an electronic subtracter to which are simultaneously applied the output-voltage of said high-gain-amplifier, and said saturation signal proportional to the degree of saturation of the color to be reproduced on said projection screen;

two non-linear-amplifiers respectively energized by said adder and by said subtracter;

and another electronic subtracter energized by said two non-linear-amplifiers simultaneously, the output voltage of said other subtracter being applied, as feed-back, to the input terminal of said high-gain-amplifier.

No references cited.

DAVID G. REDINBAUGH, *Primary Examiner.*